United States Patent
Caillouette et al.

(10) Patent No.: US 12,187,897 B2
(45) Date of Patent: Jan. 7, 2025

(54) WOOD COMPOSITE ARTICLES

(71) Applicant: BASF SE, Ludwigshafen am Rhein (DE)

(72) Inventors: Lyle Caillouette, Wyandotte, MI (US); Staci L. Wegener, Wyandotte, MI (US); Chris Lacarte, Toronto (CA); Calvin T. Peeler, Wyandotte, MI (US)

(73) Assignee: BASF SE

( * ) Notice: Subject to any disclaimer, the term of this patent is extended or adjusted under 35 U.S.C. 154(b) by 859 days.

(21) Appl. No.: 17/054,568

(22) PCT Filed: May 16, 2019

(86) PCT No.: PCT/US2019/032646
§ 371 (c)(1),
(2) Date: Nov. 11, 2020

(87) PCT Pub. No.: WO2019/222490
PCT Pub. Date: Nov. 21, 2019

(65) Prior Publication Data
US 2021/0238425 A1  Aug. 5, 2021

Related U.S. Application Data

(60) Provisional application No. 62/672,192, filed on May 16, 2018.

(51) Int. Cl.
| | | |
|---|---|---|
| C08L 97/02 | (2006.01) | |
| C08G 18/24 | (2006.01) | |
| C08G 18/32 | (2006.01) | |
| C08G 18/36 | (2006.01) | |
| C08G 18/50 | (2006.01) | |
| C08G 18/66 | (2006.01) | |
| C08G 18/76 | (2006.01) | |
| C09J 175/04 | (2006.01) | |

(52) U.S. Cl.
CPC ............ C08L 97/02 (2013.01); C08G 18/242 (2013.01); C08G 18/3206 (2013.01); C08G 18/36 (2013.01); C08G 18/5033 (2013.01); C08G 18/6696 (2013.01); C08G 18/7664 (2013.01); C09J 175/04 (2013.01)

(58) Field of Classification Search
CPC ....... C08L 97/02; C08L 75/04; C08G 18/242; C09J 175/04; C08K 7/14
See application file for complete search history.

(56) References Cited

U.S. PATENT DOCUMENTS

| | | |
|---|---|---|
| 3,416,727 A | 12/1968 | Collins |
| 8,181,580 B2 | 5/2012 | Roth et al. |
| 9,650,466 B2 | 5/2017 | Shutov |
| 2002/0068161 A1* | 6/2002 | Matuana ................. B27N 3/00 428/292.4 |
| 2005/0214537 A1 | 9/2005 | Pohlmann |
| 2012/0292805 A1 | 11/2012 | Clark et al. |
| 2016/0215144 A1 | 7/2016 | Mente |
| 2019/0345338 A1* | 11/2019 | Clausi ................. C08G 18/302 |

FOREIGN PATENT DOCUMENTS

| | | | |
|---|---|---|---|
| CA | 3035918 A1 | 3/2018 | |
| CN | 103118865 A | 5/2013 | |
| CN | 103747952 A | 4/2014 | |
| DE | 4206865 C1 | 9/1993 | |
| DE | 102001011931 | 9/2005 | |
| JP | H10 235621 A | 9/1998 | |
| JP | 2000-204267 A | 7/2000 | |
| KR | 2002-0075820 A | 10/2002 | |
| WO | 2012/018934 | 2/2012 | |
| WO | 2013/012845 | 1/2013 | |
| WO | WO-2018045466 A1 * | 3/2018 | ........... B27N 1/0218 |

OTHER PUBLICATIONS

First Office Action and Search Report from corresponding Chinese Patent Application No. 201980031910.7 dated Dec. 23, 2021, and a partial English translation.
International Preliminary Report on Patentability from counterpart PCT International Appln. No. PCT/US2019/032646 dated Nov. 26, 2020.
International Search Report and Written Opinion from counterpart PCT International Appln. No. PCT/US2019/032646 dated Sep. 3, 2019.
First Examination Report from corresponding Indian Patent Appln. No. 202027051219 dated Jul. 4, 2022.

* cited by examiner

Primary Examiner — Ling Siu Choi
Assistant Examiner — Olga Lucia Donahue
(74) Attorney, Agent, or Firm — Grüneberg and Myers PLLC

(57) ABSTRACT

A wood composite article includes a plurality of wood pieces and an adhesive system disposed on or dispersed among the plurality of wood pieces for bonding the plurality of wood pieces. The adhesive system includes a binder component and a fiber component. The binder component comprises a thermosetting plastic component such as unsaturated polyesters, epoxy, polyurea, polyurethane or combinations thereof, including for example, an isocyanate compound and an isocyanate-reactive component. The composite article may be formed into various objects such as railroad ties, fencing and the like.

22 Claims, No Drawings

WOOD COMPOSITE ARTICLES

FIELD OF THE DISCLOSURE

The present disclosure generally relates to composite articles, and more specifically, to composite articles resulting from wood-based items, wherein such wood-based items are processed with novel binder formulations comprising thermosetting plastic material components and optionally utilizing additional components that allow for the development and production of articles, such as railroad ties, having improved functionality. The present disclosure provides novel methods for restoring, recycling and repurposing wood-based items.

DESCRIPTION OF THE RELATED ART

Railroad ties are used to position rails and have historically been made of wood. Wood has inherent properties that makes it the number one choice for over 93% of all track applications in North America and most of the world today. It is stiff, but forgiving. It can be easily spiked or drilled for rail fastening systems, and it holds up under millions of gross tons of traffic. Typically, a variety of softwood and hardwoods timbers are used as ties, including oak, jarrah and karri. Nevertheless, despite their functionality, there are numerous problems associated with the utility of railroad ties made from wood. In order to prevent rot and damage such as splitting, insect infestation, plate-cutting and spike-pull, due to a harsh conditions such as weather and other stresses, railroad ties are often treated with chemicals and preservatives. While creosote is the most common preservative for railway ties, other preservatives also used include pentachlorophenol, chromated copper arsenate, and others preservatives. The use of such chemicals and preservatives can result in unintended consequences such as negative environmental impact.

In addition to necessary application of chemicals, environmental exposure drastically affects life cycle costs and durability for railroad ties. Other wood-based products also subject to such problems include structures such as fencing, railing, piers, marine pilings, utility and electric poles, lumber, and decking.

Furthermore, the use of treated wood such as pressure treated wood creates a potential for toxins to leach into the ground as the chemicals injected into pressure treated wood are released into the soil and create potentially hazardous conditions. Moreover, the production of creosote often generates additional byproducts that are highly regulated as being potentially hazardous.

An additional problem associated with railroad ties, and other wood-based components is that due to forestry restrictions imposed on forestry operations around the world, the supply of wood is becoming increasing limited. In light of the declining areas of mature forests and environmental need to protect trees, products using recycled materials to replace products presently using these protected hardwoods are needed. It is becoming increasingly apparent that there is a serious need for recycling and repurposing such wood related articles and structures. Rather than allowing worn out wooden articles, such as railroad ties to become unusable garbage, what is necessary is a method to re-process the wood, break it down and convert it to a useful article. Preferably, such a process results in the production of articles having improved functionality, and articles that are reinforced and engineered such that they overcome the limitations resulting from wood that has been pre-treated with undesirable chemicals.

Theoretically, binder compositions may be used for making wood-based composite articles including phenol formaldehyde (PF) resins, urea formaldehyde (UF) resins and isocyanate resins. Binder compositions based on isocyanate chemistry are commercially desirable because they have low water absorption, high adhesive and cohesive strength, flexibility in formulation, versatility with respect to cure temperature and rate, excellent structural properties, the ability to bond with wood-based materials having high water contents, and importantly, zero formaldehyde emissions. Resulting composite articles utilizing such binder compositions are imparted with corresponding properties/benefits.

Wood-based materials can be treated with polymethylene poly(phenyl isocyanates) (also known as polymeric MDI or pMDI) to improve the strength of the composite article. Typically, such treatment involves applying the isocyanate to the material and allowing the isocyanate to cure, either by application of heat and pressure or at room temperature. While it is possible to allow the pMDI to cure under ambient conditions, residual isocyanate (NCO) groups remain on the treated articles for weeks or even months in some instances. Toluene diisocyanate (TDI) can also be utilized for such purposes, but is generally less acceptable from an environmental standpoint. Isocyanate prepolymers are among the preferred isocyanate materials that have been used in binder compositions to solve various processing problems, particularly, in reducing adhesion to press platens and for reducing reactivity of the isocyanates.

Unfortunately, disadvantages of using isocyanates in place of PF and/or UF resins include difficulty in processing due to adhesion to platens, lack of tack or cold-tack (i.e., the isocyanates are not "tacky" or "sticky"), and the need for special storage in certain scenarios. In addition, isocyanates can also have extended cure times, which reduces manufacturing output of composite articles utilizing the same. Further, some isocyanates and related components can have very high viscosities, which impairs handling of the same, and increases cost of manufacture of composite articles utilizing such components.

Accordingly, there remains an opportunity to provide improved recycling systems useful for forming wood composite articles. There also remains an opportunity to provide improved wood composite articles and improved methods of forming such wood composite articles. Furthermore, there remains an opportunity to provide novel and productive methods that enable the recycling of wood based materials such as railroad ties, fencing, and the like, resulting in products and articles with improved utility and enhanced material functionality.

SUMMARY OF THE DISCLOSURE

A wood-based composite article ("the article") includes a plurality of wood pieces (such as shredded railroad ties) and an adhesive system dispersed throughout the plurality of wood pieces for bonding the plurality of wood pieces. The adhesive system provided herein includes a binder component and fiber component. In certain embodiments, the binder component includes a thermosetting plastic component. The thermosetting plastic component may comprise thermosets, such as unsaturated polyesters, epoxy, polyurea, polyurethane or combinations thereof. The thermosetting plastic material component may comprise at least one isocyanate compound and an isocyanate-reactive component containing at least one isocyanate-reactive compound. The fiber component is utilized in an amount of at least about 0.1 parts by weight based on 100 parts by weight of the binder component. A method of forming the article includes the step of mixing the binder component and the fiber component with the plurality of wood pieces to form a mass. The method further includes the step of applying pressure and/or heat to the mass for an amount of time sufficient to form the article.

Without being bound or limited to any particular theory, it is thought that the production of a composite article by combining wood pieces (such as shredded railroad ties) together with binder component comprising thermosetting plastic material and adding a fiber component to the mixture, imparts to the resulting composite article, improved functionality including better durability, and versatility. It is believed that such composite articles display numerous excellent physical properties. For example, in certain embodiments, the articles may have one or more of the following: increased bond strength, improved weather resistance, improved strength, improved flexural modulus, and/or reduced emissions, each relative to conventional articles.

DETAILED DESCRIPTION OF THE INVENTION

Wood composite articles (the "article") together with methods for making such articles are disclosed herein. The articles can be used for various applications. Examples of such applications include, but are not limited to, railroad ties, fencing, support structures, pilings, packaging (crates); furniture and cabinetry; roof and floor sheathing; roof, floor, and siding paneling; for window and door frames, utility poles, landscaping objects; and webstock, e.g. webstock for engineered I-beams.

The articles, in various embodiments, can be referred to as various forms of engineered wood composites, e.g., as engineered wood composites, such as oriented strand board (OSB); oriented strand lumber (OSL); scrimber; fiberboard, such as low density fiberboard (LDF), medium density fiberboard (MDF), and high density fiberboard (HDF); chipboard; flakeboard or flake board; particleboard (PB); plywood; etc. It is to be appreciated that the article may be in other engineered wood forms, such as, but not limited to, those described and exemplified herein. It is to be appreciated that the names of wood composite articles are often used interchangeably in the art.

The articles include a plurality of wood pieces. The wood pieces can be derived from a variety of materials. Generally, the wood pieces can be prepared from various species of hardwoods and/or softwoods. For example, the wood pieces may comprise hardwoods, softwoods, creosote treated hardwood, creosote treated softwood, non-creosote wood, pressure-treated wood, mulch of pine, cedar, oak, reclaimed wood, or recycled wood.

Non-lignocellulosic materials in flake, fibrous or other particulate form, such as glass fiber, basalt fibers, mica, asbestos, rubber, plastics, etc., can also be mixed with the wood material.

The wood pieces can come from a variety of sources, such as railroad ties, wood structures, small logs, industrial wood residue, branches, rough pulpwood, wherein such wood pieces may be formed into shredded pieces, sawdust, chips, flakes, mulch, wafer, strands, scrim, fibers, sheets, etc. It is to be appreciated that the article can include various combinations of the aforementioned materials and/or pieces, such as strands and sawdust. In addition, the article may be formed into shapes other than railroad ties.

The wood pieces can be produced by various conventional techniques. For example, pulpwood grade logs can be converted into flakes in one operation with a conventional roundwood flaker. Alternatively, logs and logging residue can be cut into fingerlings on the order of from about 0.5 to about 3.5 inches long with a conventional apparatus, and the fingerlings flaked in a conventional ring type flaker. The logs are typically debarked before flaking. The articles contemplated herein are not limited to any particular method of forming the wood pieces.

The dimensions of the wood pieces may or may not be particularly critical. In certain embodiments, the wood pieces include pieces or railroad ties that have been cut or shred into dimensions of varying lengths. For example, in an embodiment, the wood pieces may have a width of approximately $\frac{1}{16}$ inch to 6 inches, a length of approximately 0.1 inch to 12 inches, and a thickness of approximately $\frac{1}{2}$ inch to 6 inches. In an alternative embodiment, the wood pieces may have a width of approximately $\frac{1}{4}$ inch, a length of approximately 3 inches, and a thickness of approximately $\frac{1}{2}$ inch. In yet another alternative embodiment, the wood pieces may have a width of approximately $\frac{1}{16}$ inch, a length of approximately 3 inches, and a thickness of approximately $\frac{1}{2}$ inch. In yet another alternative embodiment, the wood pieces may have a width of approximately $\frac{1}{8}$-2 inches, a length of approximately 1-12 inches, and a thickness of approximately $\frac{1}{4}$ inch. In certain embodiments, the ratio of width to length for the wood pieces ranges from approximately 1:1 to 1:10, 1:1 to 1:20, 1:1 to 1:30, 1:1 to 1:40, 1:1 to 1:50, or 1:1 to 1:100 including but not limited to 1:1, 1:2, 1:3, 1:4, 1:5, 1:6, 1:7, 1:8, 1:9, 1:10, 1:20, 1:30, 1:40, 1:50, 1:60 and 1:80. As would be evident to one of skill in the art, the dimensions of the wood pieces may be adjusted in accordance with the intended purpose and identity of the composite article to be produced. Furthermore, a mixture of wood pieces having different dimensions may also be utilized in accordance with the invention. Detailed information on suitable sizes and shapes of wood pieces, is described in U.S. Pat. No. 9,920,202 to Hill et al. the disclosure of which is incorporated herein by reference in its entirety.

The wood pieces can have various moisture contents, where if present, water can serve as an isocyanate-reactive component, which is described further below. Typically, the wood pieces have a moisture content of from about 1 to about 20, about 2 to about 15, about 3 to about 12, or about 5 to about 10, parts by weight (water), based on 100 parts by weight of the wood pieces, or any subrange in between. If present in (and/or on) the wood pieces, the water assists in the curing or setting of the article. It is to be appreciated that the wood pieces can have inherent moisture content; or alternatively, water may be added to or removed from the wood pieces, such as by wetting or drying the wood pieces, respectively, to obtain a desired moisture content of the wood pieces prior to and/or during formation of the article.

The wood pieces are utilized in the article in various amounts, depending on the type of article desired to be formed. Typically, such as in railroad tie applications, the wood pieces are utilized in an amount of from about 0.5 to about 90 parts, 5 to about 85 parts, 10 to about 80 parts, 15 to about 75 parts, 30 to about 99, about 85 to about 98, about 90 to about 97, or about 92 to about 95.5, parts by weight, based on 100 parts by weight of the article, or any subrange in between. It is to be appreciated that the amounts can be higher or lower depending on various factors, including moisture content of the wood pieces. For example, moisture content of the wood pieces can vary by geographic location, source, etc., such as variations resulting from use of the starting wood pieces from different environments.

The article further includes an adhesive system. In certain embodiments, the article includes the wood pieces and the adhesive system. In further embodiments, the article consists essentially of the wood pieces and the adhesive system. In yet further embodiments, the article consists of the wood pieces and the adhesive system. In other related embodiments, the article further includes a fiber component, and/or an additive component.

The adhesive system is disposed on the wood pieces for bonding the wood pieces. By "disposed on", it is meant that the adhesive system is in contact with at least a portion of the wood pieces; in addition, it also means that the adhesive system is dispersed into a mixture of wood pieces. The adhesive system includes a binder component and a fiber component such as a glass fiber component. The adhesive system may include one or more additional components, as described below. The adhesive is generally formed from the binder component and the fiber component. It is to be appreciated that in many embodiments, the binder component reacts (e.g. with water, itself, and/or another component), such that it may only exist for a period of time during formation of the article. For example, most to all of the binder component may be reacted during formation of the article such that little to no binder component remains in the article after formation. In other embodiments, some amount of the binder component may be present in the article after formation.

The binder component is typically chosen from thermosetting plastic material component and a fiber component, wherein the thermosetting plastic material component comprises thermosets, such as unsaturated polyesters, epoxy, polyurea, polyurethane or combinations thereof. The thermosetting plastic material component may comprise at least one isocyanate compound and an isocyanate-reactive component containing at least one isocyanate-reactive compound. In certain embodiments the binder may further optionally include additives such as fillers, pigments, colorants, light stabilizers, mold release agents, pesticides, fungicides, mildewcides, rheology control agents, formaldehyde resins, protein-based adhesives, or a combination thereof. If utilized, the isocyanate component is typically a polymeric diphenylmethane diisocyanate (pMDI); however, other isocyanates can also be utilized as described below. If utilized, the formaldehyde resin is typically a urea formaldehyde (UF) resin or a melamine UF resin, however, other formaldehydes can also be used, e.g. a phenol formaldehyde (PF) resin. If utilized, the protein-based adhesive is typically a soy-based adhesive, however, other protein-based adhesives can also be utilized, e.g. a casein-based adhesive.

In general, the binder component may only be present for some amount of time prior to a reaction product thereof curing to a final cured state to form the adhesive system, and therefore, the article. In other words, the reaction product is generally the final cured state of the adhesive system, after reaction occurs between the components used to form the article, e.g. after reaction between the isocyanate component and an isocyanate-reactive component (described below).

Components of the adhesive can be premixed or combined to form the adhesive system and then the adhesive system can be applied to the wood pieces. In certain embodiments, the binder component, the fiber component, and optionally, one or more additional components, are individually applied to the wood pieces, and/or already present thereon, during formation of the article, rather then being premixed and applied. In other embodiments, two or more of the components are premixed and applied, e.g. the binder and fiber components, the fiber and isocyanate-reactive components, etc.

The binder component generally adheres the wood pieces to one another, once cured. For example, the reaction product of the isocyanate component and the isocyanate-reactive component can bond the wood pieces via linkages, e.g. urea linkages. The fiber component is generally inert such that it is not part of the reaction product (albeit it may be present therein). General mechanisms of adhesion, for wood composites, are detailed in pages 397 through 399 of The Polyurethanes Handbook (David Randall & Steve Lee eds., John Wiley & Sons, Ltd. 2002), the disclosure of which is incorporated herein by reference in its entirety in various non-limiting embodiments.

In an embodiment of the binder component, the adhesive system includes a thermosetting plastic material component and a fiber component. The thermosetting plastic material component comprises thermosets, such as unsaturated polyesters, epoxy, polyurea, polyurethane or combinations thereof. The thermosetting plastic material component may comprise at least one isocyanate compound (or component) and an isocyanate-reactive component containing at least one isocyanate-reactive compound.

The isocyanate component is typically a polyisocyanate having two or more functional groups, e.g. two or more isocyanate (NCO) groups. Said another way, the isocyanate component can just be an isocyanate or a combination of isocyanates. Suitable organic polyisocyanates include, but are not limited to, conventional aliphatic, cycloaliphatic, araliphatic and aromatic isocyanates. In certain embodiments, the isocyanate component is chosen from diphenylmethane diisocyanates (MDIs), polymeric diphenylmethane diisocyanates (pMDIs), and combinations thereof. Polymeric diphenylmethane diisocyanates can also be called polymethylene polyphenylene polyisocyanates. In other embodiments, the isocyanate component is an emulsifiable MDI (eMDI). Examples of other suitable isocyanates include, but are not limited to, toluene diisocyanates (TDIs), hexamethylene diisocyanates (HDIs), isophorone diisocyanates (IPDIs), naphthalene diisocyanates (NDIs), and combinations thereof. In a specific embodiment, the isocyanate component is MDI. In another specific embodiment, the isocyanate component is pMDI. In further specific embodiments, the isocyanate component is a combination of MDI and pMDI. In yet another specific embodiment, the isocyanate component is Elastoflex® W which is a soft foam system derived from MDI, TDI and/or their mixture in tailor-made formulations with densities from 30 to 80 kg/m$^3$ according to article specifications. Elastoflex® W is available from BASF Corporation of Florham Park, NJ.

In certain embodiments, the isocyanate component is an isocyanate-terminated prepolymer. The isocyanate-terminated prepolymer is a reaction product of an isocyanate and a polyol and/or a polyamine. The isocyanate may be any type of isocyanate in the polyurethane art, such as one of the polyisocyanates. If utilized to make the isocyanate-terminated prepolymer, the polyol is typically chosen from ethylene glycol, diethylene glycol, propylene glycol, dipropylene glycol, butane diol, glycerol, trimethylolpropane, triethanolamine, pentaerythritol, sorbitol, and combinations thereof. The polyol may also be a polyol as described and exemplified further below with discussion of the isocyanate-reactive component. If utilized to make the isocyanate-terminated prepolymer, the polyamine is typically chosen from ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof. The isocyanate-terminated prepolymer may be formed from a combination of two or more of the aforementioned polyols and/or polyamines.

The isocyanates or isocyanate-terminated prepolymers may also be used in the form of an aqueous emulsion by mixing such materials with water in the presence of an emulsifying agent. The isocyanate component may also be a modified isocyanate, such as, carbodiimides, allophanates, isocyanurates, and biurets.

Other suitable isocyanates include those described in U.S. Pat. No. 4,742,113 to Gismondi et al.; U.S. Pat. No. 5,093,412 to Mente et al.; U.S. Pat. No. 5,425,976 to Clarke et al.; U.S. Pat. No. 6,297,313 to Hsu; U.S. Pat. No. 6,352,661 to Thompson et al.; U.S. Pat. No. 6,451,101 to Mente et al.; U.S. Pat. No. 6,458,238 to Mente et al.; U.S. Pat. No. 6,464,820 to Mente et al.; U.S. Pat. No. 6,638,459 to Mente et al.; U.S. Pat. No. 6,649,098 to Mente et al.; U.S. Pat. No. 6,822,042 to Capps; U.S. Pat. No. 6,846,849 to Capps; U.S. Pat. No. 7,422,787 to Evers et al.; U.S. Pat. No. 7,439,280 to Lu et al.; and U.S. Pat. No. 8,486,523 to Mente; and U.S. Publication No. 2005/0242459 to Savino et al.; the disclosures of which are incorporated herein by reference in their entirety in various non-limiting embodiments.

Additional specific examples of suitable isocyanate components are commercially available from BASF Corporation of Florham Park, NJ, under the trademark LUPRANATE®, such as LUPRANATE® M, LUPRANATE® M20, LUPRANATE® MI, LUPRANATE® M20SB, LUPRANATE® M20HB, and LUPRANATE® M20FB isocyanates. In one embodiment, the isocyanate component is LUPRANATE® M20. In another embodiment, the isocyanate component is LUPRANATE® M20FB. It is to be appreciated that the isocyanate component may include any combination of the aforementioned isocyanates and/or isocyanate-terminated prepolymers.

If utilized, the isocyanate component typically has a viscosity which is suitable for specific applications of the isocyanate component to the wood pieces, such as by spraying, fogging and/or atomizing the isocyanate component to apply the isocyanate component to the wood pieces. Typically, the isocyanate component has a viscosity of from about 100 to about 5,000, about 100 to about 2,500, or about 100 to about 1,000, cps at 25° C. according to ASTM D2196, or any subrange in between. Regardless of the application technique, the viscosity of the isocyanate component should be sufficient to adequately coat the wood pieces.

The adhesive system can include the reaction product of the isocyanate component and the isocyanate-reactive component. In one embodiment, the isocyanate-reactive component is water, which may be applied to and/or already present on the wood pieces, e.g. as a preexisting moisture content (or a portion thereof). In other embodiments, the isocyanate-reactive component includes a polyol and/or a polyamine. In certain embodiments, the isocyanate-reactive component includes a polymer polyol, which may also be referred to as a graft polyol. The isocyanate-reactive component can include a combination of the aforementioned isocyanate-reactive components, e.g. water and a polyol.

Typically, such as in railroad tie applications, the isocyanate-reactive component is utilized in an amount of from about 1 to about 30, about 1 to about 15, or about 2 to about 10, parts by weight, based on 100 parts by weight of wood pieces, or any subrange in between. The amounts described herein are generally based on the assumption that the wood pieces are completely dry to account for variations in moisture contents of the wood pieces. More specific amounts are described below. If water is utilized at the isocyanate-reactive component, it can be present in these amounts or in the amounts regarding moisture content of the wood pieces.

If utilized, the polyol is typically chosen from conventional polyols, such as ethylene glycol, diethylene glycol, propylene glycol, dipropylene glycol, butane diol, glycerol, trimethylolpropane, triethanolamine, pentaerythritol, sorbitol, and combinations thereof. Other suitable polyols include, but are not limited to, biopolyols, such as soybean oil, castor-oil, soy-protein, rapeseed oil, etc., and combinations thereof. It is believed that certain polyols impart plasticization and/or film formation, and tackiness, which may increase with pressure. For example, some polyols may act as a plasticizer, especially in conjunction with the compatibilizer component.

Suitable polyether polyols include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene glycols obtained by the polymerization of tetrahydrofuran.

Suitable polyester polyols include, but are not limited to, hydroxyl-terminated reaction products of polyhydric alcohols, such as ethylene glycol, propylene glycol, diethylene glycol, 1,4-butanediol, neopentylglycol, 1,6-hexanediol, cyclohexane dimethanol, glycerol, trimethylolpropane, pentaerythritol or polyether polyols or mixtures of such polyhydric alcohols, and polycarboxylic acids, especially dicarboxylic acids or their ester-forming derivatives, for example succinic, glutaric and adipic acids or their dimethyl esters sebacic acid, phthalic anhydride, tetrachlorophthalic anhydride or dimethyl terephthalate or mixtures thereof. Polyester polyols obtained by the polymerization of lactones, e.g. caprolactone, in conjunction with a polyol, or of hydroxy carboxylic acids, e.g. hydroxy caproic acid, may also be used.

Suitable polyesteramides polyols may be obtained by the inclusion of aminoalcohols such as ethanolamine in polyesterification mixtures. Suitable polythioether polyols include products obtained by condensing thiodiglycol either alone or with other glycols, alkylene oxides, dicarboxylic acids, formaldehyde, aminoalcohols or aminocarboxylic acids. Suitable polycarbonate polyols include products obtained by reacting diols such as 1,3-propanediol, 1,4-butanediol, 1,6-hexanediol, diethylene glycol or tetraethylene glycol with diaryl carbonates, e.g. diphenyl carbonate, or with phosgene. Suitable polyacetal polyols include those prepared by reacting glycols such as diethylene glycol, triethylene glycol or hexanediol with formaldehyde. Other suitable polyacetal polyols may also be prepared by polymerizing cyclic acetals. Suitable polyolefin polyols include hydroxy-terminated butadiene homo- and copolymers and suitable polysiloxane polyols include polydimethylsiloxane diols and triols.

Specific examples of suitable polyols are commercially available from BASF Corporation under the trademark of PLURACOL®. It is to be appreciated that the isocyanate-reactive component may include any combination of two or more of the aforementioned polyols.

In certain embodiments utilizing the polymer polyol, the polymer polyol is a graft polyol. Graft polyols may also be referred to as graft dispersion polyols or graft polymer polyols. Graft polyols often include products, i.e., polymeric particles, obtained by the in-situ polymerization of one or more vinyl monomers, e.g. styrene monomers and/or acrylonitrile monomers, and a macromer in a polyol, e.g. a polyether polyol. In one embodiment, the isocyanate-reactive component is a styrene-acrylonitrile (SAN) graft polyol.

In other embodiments, the polymer polyol is chosen from polyharnstoff (PHD) polyols, polyisocyanate polyaddition (PIPA) polyols, and combinations thereof. It is to be appreciated that the isocyanate-reactive component can include any combination of the aforementioned polymer polyols. PHD polyols are typically formed by in-situ reaction of a diisocyanate with a diamine in a polyol to give a stable dispersion of polyurea particles. PIPA polyols are similar to PHD polyols, except that the dispersion is typically formed by in-situ reaction of a diisocyanate with an alkanoamine instead of a diamine, to give a polyurethane dispersion in a polyol. The article is not limited to any particular method of making the polymer polyol.

If utilized, the polymer polyol can serve as a sizing agent substitute, e.g. a sizing wax or wax sizing agent substitute, specifically by imparting a certain degree of water repellency to the article, once formed. Paraffin, for example, is a common wax sizing agent for OSB and OSL applications. In certain embodiments, the article is substantially free of a wax component, such as paraffin. By "substantially free", it is meant that in these embodiments, the wax component is typically present in an amount no greater than about 5, no greater than about 2.5, no greater than about 1.5, or approaching or equaling 0, parts by weight, based on 100 parts by weight of the wood pieces, or any subrange in between. In certain embodiments, the article is completely free of a wax component.

One method by which the polymer polyol can impart water repellency is by at least partially coating a surface of the wood pieces, thus decreasing surface tension of the surface. Another method by which the polymer polyol imparts water repellency is that the polymer polyol at least partially fills capillaries within and between the wood pieces, thus providing a barrier to capillary uptake of water. Further, it is believed that the polymer polyol reduces formation of micro- and/or nano-cracks from forming within the article, for example, within the adhesive, during or after cure to form the reaction product. Yet further, if such cracks are already present in the wood pieces, the polymer polyol at least partially fills such cracks, as with description of the capillaries. It is believed that the blocking of water and filling of cracks reduces de-lamination and swelling problems when the article is exposed to moisture during use. It is further believed that such "filling" largely occurs due to the polymeric particles of the polymer polyol.

In various embodiments, the polymer polyol includes a continuous phase and a discontinuous phase. The continuous phase of the polymer polyol is not generally miscible with the isocyanate component, which provides for increased coverage of the polymeric particles with reactive groups, such as hydroxyl (OH) groups. Such reactive groups can further impart crosslinking in the article, once the reactive groups are reacted. The polymeric particles are further described below.

In certain embodiments, the polyol of the polymer polyol is a hydrophobic polyol. In a specific embodiment, the polyol is a hydrophobic polyether polyol. In another specific embodiment, the polyol is a hydrophobic polyester polyol. The hydrophobic polyol contains alkylene oxides. In these embodiments, the hydrophobic polyol typically has from about 0 to about 50, about 2 to about 20, or about 5 to about 15, parts by weight of ethylene oxide (EO), based on 100 parts by weight of the alkylene oxides of the hydrophobic polyol, or any subrange in between. In other embodiments, the hydrophobic polyol typically has at least 60, at least 70, or at least 80, parts by weight propylene oxide (PO), based on 100 parts by weight of the alkylene oxides, or any subrange in between. Accordingly, in these embodiments, the hydrophobic polyol is a propylene oxide rich polyol, which imparts the hydrophobic polyol with hydrophobicity, and therefore further imparts the article with hydrophobicity.

In certain embodiments, the alkylene oxides of the hydrophobic polyol include a mixture of EO and PO. In another embodiment, the alkylene oxides of the hydrophobic polyol include only PO, i.e., the hydrophobic polyol does not include other alkylene oxides, such as EO. In certain embodiments, the hydrophobic polyol includes other types of alkylene oxides known in the art, e.g. butylene oxide (BO), in combination with PO, and optionally, in combination with EO. The alkylene oxides of the hydrophobic polyol may be arranged in various configurations, such as a random (heteric) configuration, a block configuration, a capped configuration, or a combination thereof. For example, in one embodiment, the hydrophobic polyol includes a heteric mixture of EO and PO.

In certain embodiments, the hydrophobic polyol is terminally capped with EO. The hydrophobic polyol typically has a terminal cap of from about 5 to about 25, about 5 to about 20, or about 10 to about 15, parts by weight EO, based on 100 parts by weight of the hydrophobic polyol, or any subrange in between. In certain embodiments, the EO may only be present in the terminal ethylene oxide cap; however, in other embodiments, the EO may also be present along with the PO, and optionally, with other alkylene oxides, e.g. BO, in the alkylene oxides of the hydrophobic polyol. Generally, it is thought that increasing the PO content of the hydrophobic polyol is preferred in order to impart increased hydrophobicity to the article.

Suitable hydrophobic polyols include, but are not limited to, glycerine-initiated, trimethylolpropane-initiated, propylene glycol-initiated, and sucrose-initiated polyether polyols, and combinations thereof. In one embodiment, the hydrophobic polyol is a glycerine-initiated polyether polyol. The alkylene oxides of the hydrophobic polyol generally extend from the respective initiator portion of the hydrophobic polyol.

The discontinuous phase of the graft polyol includes polymeric particles. If micro- and/or nano-cracks are present in the wood pieces, it is believed that the polymeric particles of the discontinuous phase of the polymer polyol at least partially fill these cracks. The polymeric particles are generally large in size due to their macromer constituents, i.e., the polymeric particles have micrometer or larger dimensions, e.g. micrometer or larger diameters. In certain embodiments, the polymeric particles have average diameters ranging from about 0.1 to about 10 microns, alternatively from about 0.1 to about 1.5 microns, or any subrange in between. In other embodiments, the polymeric particles have average diameters less than 0.1 microns, which imparts the polymer polyol with nano-polymeric particles. Blocking of water and filling of cracks reduces de-lamination and swelling problems when the article is exposed to moisture during storage or use. In addition to filling cracks, in certain embodiments, the polymeric particles are reactive with the isocyanate component, which may increase internal bond (IB) strength of the article. The polymeric particles typically include the reaction product of monomers chosen from styrenes, e.g. alpha-methyl styrene, acrylonitriles, esters of acrylic and methacrylic acids, ethylenically unsaturated nitriles, amines, amides, and combinations thereof. In certain embodiments, the polymeric particles include the further reaction of a macromer, such as a polyol having an unsaturation, which permits chemical incorporation of the polymeric particle. In these embodiments, it is believed that the polymeric particles can impart crosslinking in the article, due to reactive groups attached to the polymeric particles, e.g. OH groups, which can react with the isocyanate component. It is also believed that the polymeric particles can serve as a "hot melt" adhesive depending on their specific chemical makeup, e.g. polymeric particles formed from styrene and acrylonitrile monomers.

In one embodiment, the polymeric particles include styrene acrylonitrile (SAN) copolymers, which are the reaction product of styrene monomers and acrylonitrile monomers. Typically, the SAN copolymers have a weight ratio of styrene to acrylonitrile of from about 30:70 to about 70:30, about 40:60 to about 60:40, about 45:55 to about 60:40, about 50:50 to about 60:40, or about 55:45 to about 60:40, or any subrange in between. In one embodiment, the SAN copolymers have a weight ratio of styrene to acrylonitrile of about 66.7:33.3. In another embodiment, the polymeric particles are urea, which are the reaction product of an amine monomer and an isocyanate (NCO) group, such as an NCO group of a diisocyanate. In yet another embodiment, the polymeric particles are urethane, which are the reaction product of an alcohol monomer and an isocyanate (NCO) group, such as an NCO group of a diisocyanate.

Typically, the polymeric particles are present in the polymer polyol in an amount of from about 5 to about 70, about 15 to about 55, or about 25 to about 50, parts by weight, based on 100 parts by weight of the polymer polyol, or any subrange in between. In one embodiment, the polymeric particles are present in the polymer polyol in an amount of about 65 parts by weight based on 100 parts by weight of the graft polyol. Generally, increasing the amount of polymeric particles increases the water repellency of the article.

The polymer polyol typically has a molecular weight of from about 400 to about 20,000, about 500 to about 10,000, about 600 to about 5,000, or about 700 to about 3,000, or any subrange in between. In one embodiment, the polymer polyol has a molecular weight of about 730. In another embodiment, the polymer polyol has a molecular weight of about 3,000.

Other suitable polymer polyols and methods of making the same include those described in U.S. Pat. No. 4,522,976 to Grace et al.; U.S. Pat. No. 5,093,412 to Mente et al.; U.S. Pat. No. 5,179,131 to Wujcik et al.; U.S. Pat. No. 5,223,570 to Huang et al.; U.S. Pat. No. 5,594,066 to Heinemann et al.; U.S. Pat. No. 5,814,699 to Kratz et al.; U.S. Pat. No. 6,034,146 to Falke et al.; U.S. Pat. No. 6,103,140 to Falke et al.; U.S. Pat. No. 6,352,658 to Chang et al.; U.S. Pat. No. 6,432,543 to Harrison et al.; U.S. Pat. No. 6,472,447 to Lorenz et al.; U.S. Pat. No. 6,649,107 to Harrison et al.; and U.S. Pat. No. 7,179,882 to Adkins et al., the disclosures of which are incorporated herein by reference in various non-limiting embodiments.

Specific examples of suitable polymer polyols are commercially available from BASF Corporation, under the trademark PLURACOL®, such as PLURACOL® 1365, PLURACOL® 4600, PLURACOL® 4650, PLURACOL® 4800, PLURACOL® 4815, PLURACOL® 4830, and PLURACOL® 4850 graft polyols. In a specific embodiment, the isocyanate-reactive component includes PLURACOL® 4650. In another embodiment, the isocyanate-reactive component is PLURACOL® 2086 and/or PLURACOL® 593. The isocyanate-reactive component may include any combination of the aforementioned polymer polyols. Detailed information on polymer polyols is described on pages 104 and 105 of The Polyurethanes Handbook (David Randall & Steve Lee eds., John Wiley & Sons, Ltd. 2002), which are incorporated herein in their entirety in various non-limiting embodiments.

If utilized, the polymer polyol typically has a viscosity which is suitable for specific applications of the polymer polyol to the wood pieces, such as by spraying, fogging and/or atomizing the polymer polyol to apply the polymer polyol to the wood pieces. Typically, the polymer polyol has a viscosity of from about 100 to about 10,000, about 500 to about 5,000, or about 500 to about 3,000, cps at 25° C. according to ASTM D2196, or any subrange in between. Regardless of application technique, the viscosity of the polymer polyol should be sufficient to adequately coat the wood pieces.

If utilized, the polymer polyol is typically utilized in an amount of from about 5 to about 40, about 10 to about 30, or about 15 to about 25, parts by weight, based on 100 parts by weight of the adhesive system, or any subrange in between. The isocyanate-reactive component may include any combination of the aforementioned polyols, polymeric particles, and/or types of polymer polyols.

The adhesive system may further include an auxiliary polyol, different than the polyol in the polymer polyol, if the isocyanate component is utilized as the binder component. Suitable polyols for use as the auxiliary polyol are as described with the isocyanate-terminated prepolymer. The auxiliary polyol can be used for various purposes. For example, an auxiliary polyol having a higher functionality (relative to the polyol of the polymer polyol) can be utilized to provide additional reactive groups for reaction with the isocyanate component, or an auxiliary polyol can be utilized to increase or decrease viscosity of the adhesive system. The auxiliary polyol may be utilized in various amounts.

In an alternative embodiment of the binder component, the binder component of the adhesive system may include a UF resin, a phenol formaldehyde (PF) resin, or a melamine UF (MUF) resin, or a combination thereof. The PF resin may be any type in the art. Similarly, the UF resin may be any type of UF resin or melamine UF resin in the art. Suitable grades of UF resins and melamine UF resins are commercially available from a variety of suppliers, such as Hexion Specialty Chemicals Inc. of Springfield, OR. A specific example of a suitable UF resin is Casco-Resin F09RFP from Hexion.

Typically, such as in railroad tie applications, the binder component is utilized in an amount of from about 0.5 to about 50 parts, 5 to about 45 parts, 10 to about 30 parts, 1 to about 60, about 1 to about 40, about 1 to about 20, about 1 to about 15, about 2 to about 10, about 5 to 15, about 5 to 10, or about 5 to 12, parts by weight, based on 100 parts by weight of the wood pieces, or any subrange in between.

In certain embodiments, the isocyanate component is utilized in an amount of from about 1.4 to about 10.5, 2 to about 3, about 2.25 to about 2.75, or about 2.5, parts by weight, based on 100 parts by weight of the wood pieces, or any subrange in between. In other optional embodiments, where other additives are used, the UF, PF, and/or MUF resin for example, may be utilized in an amount of about 5 to about 10, about 5 to about 12, or about 5 to about 15, parts by weight based on 100 parts by weight of the wood pieces, or any subrange in between. Generally, when too little of the binder component is utilized, the resulting article does not have the necessary physical properties to be commercially successful. Likewise, when too much of the binder component is utilized, cost of manufacturing the article generally increases beyond any imparted benefits of utilizing such amounts of the binder component.

The adhesive system may further optionally include additional additive components. If utilized, the additive component is typically chosen from parting agents, sizing agents, catalysts, fillers, flame retardants, plasticizers, stabilizers, cross-linking agents, chain-extending agents, chain-terminating agents, air releasing agents, wetting agents, surface modifiers, foam stabilizing agents, moisture scavengers, desiccants, viscosity reducers, reinforcing agents, dyes, pigments, colorants, anti-oxidants, compatibility agents, ultra-violet light stabilizers, thixotropic agents, anti-aging agents, lubricants, coupling agents, solvents, rheology promoters, adhesion promoters, thickeners, smoke suppressants, anti-static agents, anti-microbial agents, fungicides, insecticides, and combinations thereof. The additive component may be utilized in various amounts and in various combinations.

Other suitable additives include those described in U.S. Publication No. 2006/0065996 to Kruesemann et al., the disclosure of which is incorporated herein by reference in its entirety in various non-limiting embodiments. The additive component may include any combination of the aforementioned additives.

In certain embodiments, the additive component includes a catalyst component. In one embodiment, the catalyst component includes a tin catalyst. Suitable tin catalysts include tin(II) salts of organic carboxylic acids, e.g. tin(II) acetate, tin(II) octoate, tin(II) ethylhexanoate and tin(II) laurate. In one embodiment, the organometallic catalyst includes dibutyltin dilaurate, which is a dialkyltin(IV) salt of an organic carboxylic acid. Specific examples of suitable organometallic catalyst, e.g. dibutyltin dilaurates, are commercially available from Air Products and Chemicals, Inc. of Allentown, PA, under the trademark DABCO®. The organometallic catalyst can also include other dialkyltin(IV) salts of organic carboxylic acids, such as dibutyltin diacetate, dibutyltin maleate and dioctyltin diacetate.

Examples of other suitable catalysts include iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trademark POLYCAT®.

Yet further examples of other suitable catalysts, specifically tertiary amine catalysts, include dimethylaminoethanol, dimethylaminoethoxyethanol, triethylamine, N,N,N', N'-tetramethylethylenediamine, N,N-dimethylaminopropylamine, N,N,N',N',N"-pentamethyldipropylenetriamine, tris(dimethylaminopropyl)amine, N,N-dimethylpiperazine, tetramethylimino-bis(propylamine), dimethylbenzylamine, trimethylamine, triethanolamine, N,N-diethyl ethanolamine, N-methylpyrrolidone, N-methylmorpholine, N-ethylmorpholine, bis(2-dimethylamino-ethyl)ether, N,N-dimethylcyclohexylamine (DMCHA), N,N,N',N',N"-pentamethyldiethylenetriamine, 1,2-dimethylimidazole, 3-(dimethylamino) propylimidazole, and combinations thereof. Specific examples of suitable tertiary amine catalysts are commercially available from Air Products and Chemicals, Inc. under the trademark POLYCAT®. The catalyst component can be utilized in various amounts. The catalyst component may include any combination of the aforementioned catalysts.

In certain embodiments, the article is substantially free of UF resin and/or PF resin. By "substantially free", it is meant that in these embodiments, the UF resin and/or PF resin is present in an amount no greater than about 15, no greater than about 10, no greater than about 5, or approaching or equaling 0, parts by weight, based on 100 parts by weight of the article, or any subrange in between. In other embodiments, the article is completely free of UF resin and/or PF resin.

The adhesive system also includes a fiber component, such that the composite article further includes the fiber dispersed among the plurality of wood pieces. By "dispersed among", it is meant that the fiber component is mixed in with at least a portion of the wood pieces. As used herein fiber may refer to a variety of materials, including but not limited to chopped fiber, continuous filament mat, dry use chopped woven mats, chopped strand mat, multi-end roving, non-wovens, single-end roving, technical fabrics and Wet-use chopped strand or combinations thereof; including but not limited to, fiberglass, E-glass, A-glass, C-glass, D-glass, R-glass, or S-glass, graphite, aramid, TPU, PBT, carbon fiber, basalt fibers, nylon, or combinations thereof. In some embodiments the fibers include Owens 995 chopped strand, commercially available from Owens Corning, NEG-T249H chopped glass strands, commercially available from Nippon Electric Glass, or any combination thereof. It is to be appreciated that various forms of the article can exist during manufacture, such as a wet/uncured state to a dry/cured state. The "wet" form of the article may also be referred to as a mass, furnish, or mat; whereas the "dry" form is generally the final form of the article, such as railroad ties etc. It is to be appreciated that the final form of the article may have some residual moisture content. The fiber component is generally present during formation of the reaction product. The fiber component may be incorporated into the wood piece composite (e.g. by stirring) or may be combined with the woods pieces (e.g. in a mixer) or both. Alternatively, the fiber may be added directly on a conveyor belt or other processing apparatus either in conjunction with, or separately from, application to, or mixture with, the wood pieces.

The fiber component may include most common types of glass fiber used in fiberglass such as E-glass, an alumino-borosilicate glass with less than 1% w/w alkali oxides. Other types of glass fibers used may include A-glass (alkali-lime glass with little or no boron oxide), E-CR-glass (Electrical/Chemical Resistance; alumino-lime silicate with less than 1% w/w alkali oxides, with high acid resistance), C-glass (alkali-lime glass with high boron oxide content, used for glass staple fibers and insulation), D-glass (borosilicate glass, named for its low Dielectric constant), R-glass (alumino silicate glass without MgO and CaO with high mechanical requirements as reinforcement), and S-glass (alumino silicate glass without CaO but with high MgO content with high tensile strength). Glass fiber components are available in numerous embodiments including chopped strand mat, continuous filament mat, dry-use chopped strand, multi-end roving, non-wovens, single-end roving, technical fabrics and wet-use chopped strand. The selection of the glass fiber component is based upon several factors, including but not limited to choppablility, dispersion, durability, mechanical and hydrolysis resistance property of the finished product, resistance to mechanical cracking, shrinkage resistance, static control, strength of finished composite products, molding ability, compatibility with polyurethane and aesthetic and design flexibility.

In an embodiment, the glass fiber component comprises fiberglass roving ER13-2400-180 (Jushi Group Co., Ltd. California, USA). In an alternative embodiment, the glass fiber component may be selected from any commercially available products, including but not limited to a variety of glass fiber products available from companies such as Jushi Group Co., Ltd. California, USA, or Owens Corning Ohio, USA (for example, Anti-CRAK® Chopped Strands/HD, Anti-CRAK® Chopped Strands HP/HD Anti-CRAK® Fibers, HydroStrand® chopped strands 258 for PA, and HydroStrand® chopped strands 276 for PBT).

Typically, the binder component and fiber component are utilized in the article in a combined amount of from about 1 to about 25, about 1 to about 15, about 1 to about 10, or about 5 to about 10, parts by weight, based on 100 parts by weight of the wood pieces, or any subrange in between. By "combined amount", it is meant that each of the binder component and the fiber component are individually utilized in the article in a positive amount, i.e., in an amount greater than zero (0) parts by weight based 100 parts by weight of the wood pieces. The binder component and fiber component can be utilized in the article in various weight ratios. In various embodiments, this ratio is from 0.1:1 to 1:0.1. In another embodiment, this ratio is about 1:1. It is to be appreciated that the other optional components, e.g. the additive component, can also be utilized to form the article. In related embodiments, the adhesive system is utilized in an amount of from about 1 to about 15 parts, or about 1 to about 25 parts, by weight based on 100 parts by weight of said article, or any subrange in between. In certain embodiments, the binder component and glass fiber components are present in a ratio of approximately 1:0.1, 1:0.2, 1:0.3, 1:0.4, 1:0.5, 1:1, 1:2, 1:3, 1:4, or 1:5. As would be evident to one skilled in the art, these ratios may be adjusted based on the identity of the resulting composite article.

In certain embodiments, the adhesive system includes the binder component and the fiber component. In further embodiments, the adhesive system consists essentially of binder component and the fiber component. In yet further embodiments, the adhesive system consists of binder component and the fiber component. In other related embodiments, the binder component comprises in whole, or in part, thermosetting plastic material, and a fiber component. Other components may also be present, such as additive components an isocyanate, a hydrophobic polyol, an agent for increasing cross link density and improving homogenization, a chain extender and a catalyst.

The binder component and the fiber component may be supplied to consumers for use by various means, such as in railcars, tankers, large sized drums and containers or smaller sized drums, totes, and kits. For example, one drum can contain the binder component and another drum can contain the fiber component. In general, providing the components to consumers separately reduces premature potential reaction of the components and provides for increased formulation flexibility for forming the adhesive. For example, a consumer can select a specific binder component and specific fiber component, and amounts thereof, to prepare the composite article formed therefrom. If other components are utilized, such as the additive component, e.g. the catalyst component, such components can be provided separately or premixed with one of or more of the binder component or the fiber component.

The resulting composite article may be of various sizes, shapes, and thickness. For example, the article can be configured to mimic conventional composite articles, such as boards, or panels. The article can also be of various complex shapes, such as railroad ties, moldings, fascias, furniture, etc. The article can include one or more layers. For example, if the article is support structure, the article can include one layer, e.g. a core layer, two layers, e.g. a core layer and a face/fascia layer, or three or more layers, e.g. a core layer and two fascia layers. Other types of composite articles, e.g. wood composites, and their methods of manufacture, that can be formed, e.g. by utilizing the adhesive system, are described by pages 395 through 408 of The Polyurethanes Handbook (David Randall & Steve Lee eds., John Wiley & Sons, Ltd. 2002), which is incorporated herein by reference in their entirety in various non-limiting embodiments.

The article has an original thickness, i.e., a thickness after manufacture, e.g. after pressing the mat to form the final, i.e., cured, article. Typically, due to the adhesive system, the article exhibits a swelling of less than about 10%, less than about 5%, or less than about 3%, based on a 24-hour cold-soak test according to ASTM D1037. The thickness can vary, but is typically of from about 0.25 to about 10, about 0.25 to about 5, or about 0.25 to about 1.5, inches, or any subrange in between. It is to be appreciated that describing thicknesses may not be suitable when describing complex shapes other than boards or panels. As such, the article can be of various dimensions based on final configuration of the article.

The article has an internal bond (IB) strength. Typically, the IB strength is greater than about 20, greater than about 30, greater than about 40, greater than about 50, greater than about 60, greater than about 70, greater than about 80, greater than about 90, or greater than about 100, pounds per square inch (psi), according to ASTM D1037. In certain embodiments, the article has an IB strength of from about 50 to about 500, about 100 to about 300, or about 150 to about 250, psi, according to ASTM D1037, or any subrange in between.

IB strength is a tensile property. Typically, in conventional articles, as IB strength increases, flexural properties such as modulus of elasticity (MOE) and modulus of rupture (MOR) change, specifically, MOE generally decreases as IB strength increases.

Typically, the article has a MOE greater than 75,000, greater than 95,000, greater than 100,000, or greater than 110,000, psi, according to ASTM D1037. Typically, the article has a MOR greater than 3,000, greater than 3,250, greater than 3,300, or greater than 3,500, psi, according to ASTM D1037.

Also disclosed is a method of forming the article. To form the article, the wood pieces are generally provided. The wood pieces can be derived from a variety of wood sources, and can be formed from a variety of processes.

The binder component and the fiber component, and optionally other components, e.g. the isocyanate-reactive and/or additive component(s), (all of which are hereinafter referred to simply as "the components") are combined with the plurality of wood pieces to form a mass. The components can be combined with the wood pieces at the same time, or can be mixed the wood pieces at different times. In one embodiment, the binder component is combined with the wood pieces prior to the addition of a fiber component. In another embodiment, the binder component is combined with the wood pieces after the addition of a fiber component. In yet another embodiment, the binder component and the fiber component are added simultaneously to the wood pieces. For example, the binder component can be added to the wood pieces, and then the fiber component can be added to the wood pieces at some time later, or vice versa. Alternatively, the components can be applied at the same time, either separately, and/or premixed. In one embodiment, the components are blended to form the adhesive system, such that the adhesive system is applied to the wood pieces. The components can be applied to the wood pieces by various methods, such as by mixing, tumbling, rolling, spraying, sheeting, blow-line resination, blending (e.g. blow-line blending), etc. For example, the components and the wood pieces can be mixed or milled together during the formation of the mass, also referred to as a binder-wood mixture or "furnish", as further described below.

Typically, the components are applied to the wood pieces by a mixing process. The plurality of wood pieces having the binder component and the fiber component dispersed therein are then disposed on a carrier, and generally form (or define) the mass. The mass can then be formed into mat, such as by dropping the mass onto a carrier, e.g. a conveyor belt, or, alternatively, the mat can be formed directly on the carrier, i.e., the binder-wood mixture is formed directly on the carrier. In other words, the plurality of wood pieces having the binder component and the fiber component dispersed therein can be arranged on the carrier to form the mass in various ways. In an alternative embodiment, the plurality of wood pieces having the binder component and the glass fiber component dispersed therein are extruded directly into a mold having a predetermined configuration. In certain embodiments, the mass can be fed to a former, which generally forms the mass into a mat having a predetermined width and a predetermined thickness with the plurality of wood pieces loosely oriented on the carrier. The predetermined width and thickness of the mat are determined according to final widths and thicknesses desired for the composite article, as described further below. The mat can then be formed in various shapes, such as boards or panels, or formed into more complex shapes such as by molding or extruding the mat to form the article.

In certain embodiments, the components are added to the wood pieces while the wood pieces are being agitated in suitable equipment. Addition of the components can occur via use of nozzles, such as one nozzle for each individual component supplied thereto, or nozzles that have two or more components premixed and supplied thereto. Generally, at least one nozzle applies the binder component and at least one nozzle applies the glass fiber component. To maximize dispersion among the wood pieces, the components are generally added to the wood pieces as the wood pieces are being tumbled in a rotary blender or similar apparatus. As another example, the wood pieces can be mixed with the components in a rotary drum blender equipped with at least one, typically at least two or three spinning disk atomizers. Tumblers, drums, or rollers including baffles can also be used. It is believed that applying shear to the components is important, especially if such components have high viscosities. Shear force can be useful for obtaining proper dispersion of the components with respect to the wood pieces, and can be obtained by specific nozzle design to obtain proper expulsion of the components. It is believed that the components should be mixed very well, be it before or after application to the wood pieces. Of course maximum dispersion among the wood pieces with the components is desirable to ensure proper bonding. Typically, the components are not premixed prior to application, to prevent premature reaction. As such, the components may each individually be added onto the wood pieces via one or more nozzles, typically, by one nozzle per component to prevent premature reaction and/or contamination.

The amount of the components to be mixed with the wood pieces is dependent upon several variables including, the specific components utilized, the size, moisture content and type of wood pieces used, the intended use of the composite article, and the desired properties of the composite article. The resulting mass is may be formed into complex shapes, such as by molding or extruding. Alternatively, the mass may be formed into a single or multi-layered mat that is compressed into, for example, OSB, PB, scrimber, MDF, or another article of the desired shape and dimensions.

In certain embodiments, the composite article comprises the preliminary formation of a mat. The mat can be formed in any suitable manner. For example, the mass can be deposited on a plate-like carriage carried on an endless belt or conveyor from one or more hoppers spaced above the belt. In embodiments wherein a multi-layer mat is formed, a plurality of hoppers are used with each having a dispensing or forming head extending across the width of the carriage for successively depositing a separate layer of the mass/furnish as the carriage is moved between the forming heads. The mat thickness will vary depending upon such factors as the size and shape of the wood pieces, the particular technique used in forming the mat, the desired thickness and density of the final article and the pressure used during the press cycle. The thickness of the mat is usually about 5 times to about 20 times a final thickness of the article. For example, for flakeboard or particleboard panels of 0.5 inch thickness and a final density of about 35 lbs/ft3, the mat usually will originally be about 3 inches to about 6 inches thick. The width of the mat is usually substantially the same as a final width of the article; however, depending on configuration of the article, the final width may be a fraction of the thickness, similar to description of the thickness.

Typically, the wood pieces are loosely oriented in the mass and mold or mat. A carrier is provided, such as a conveyor belt or plate, and the mass is disposed on the carrier. The mass can either be formed directly on the carrier, and/or transferred to the carrier, after forming, e.g. in a tumbler. It is thought that the adhesive system substantially maintains orientation of the plurality of wood pieces in the mass while on the carrier. For the adhesive system to maintain orientation of the wood pieces there is no requirement that the orientation is maintained perfectly. For example, minor distortion may occur. In general, the adhesive system serves as a "tackifier" or as "sticky" glue, and can be used as a substitute or supplemental adhesive for UF resins and/or PF resins, as well as for other conventional adhesives. As such, the adhesive system has tack or cold-tack. Cold-tack can be determined in a variety of ways. For example, one can use a "slump" test, which employs a funnel packed full of the mass, the funnel is then tipped onto a surface and removed, such that the mass (in the shape of the funnel) remains on the surface. The funnel shaped mass can then be observed for changes in shape over time, such as changes in angle due to slumping/collapsing of the funnel shaped mass. Another example is referred to as a "snowball" test, where one can grab a handful of the mass, make a ball of the mass in hand, and toss the ball up and down to determine if the ball falls apart. Other suitable tests are described in ASTM D1037.

When the mass is formed into the mat, the adhesive system also substantially maintains the width and the thickness of the mat while the mat is on the carrier. As can be appreciated, when the carrier moves, such as by conveying, the adhesive system keeps the mat from falling apart due to vibrations. Vibrations can also occur, for example, if the carrier is a plate, and the plate is being moved to a press. Such vibrations can cause orientation problems with the wood pieces, can cause reduced internal bond (IB) strength, and can cause other similar issues.

The article is typically formed from the mass by compressing the mass at an elevated temperature and under pressure Typically, at least pressure is applied to the mass for an amount of time sufficient to form the article. Heat is also typically applied. Such conditions facilitate reaction of the adhesive system, specially, at least reaction of the binder component, to form the reaction product. By imparting tack, the adhesive system can reduce movement of the wood pieces in the mat, such as by reducing a chance that the wood pieces will blow apart when applying pressure to the mass. Specifically, speed of applying pressure to the mat to form the article can be increased relative to conventional pressing speed and/or pressures utilized to form conventional composite articles, which provides economic benefits, such as increased throughput, for manufacturers of the article.

The same tack imparted by the adhesive system is useful during movement of the mat, such as when being conveyed.

Typically, heat is applied to the mass to facilitate cure of the adhesive system. Press temperatures, pressures and times vary widely depending upon the shape, thickness and the desired density of the article, the size and type of wood pieces, e.g. wood fragments, flakes or sawdust, the moisture content of the wood pieces, and the specific components utilized. The press temperature, for example, can range from about 100° C. to about 300° C. To minimize generation of internal steam and the reduction of the moisture content of the final composite article below a desired level, the press temperature is typically less than about 250° C. and most typically from about 180° C. to about 240° C., or any subrange in between. The pressure utilized is generally from about 300 to about 800 pounds per square inch (psi), or any subrange in between. Typically, the press time is from 120 to 900 seconds, or any subrange in between. The press time utilized should be of sufficient duration to at least substantially cure the adhesive (in order to substantially form the reaction product) and to provide a composite article of the desired shape, dimension and strength. For the manufacture of, e.g. railroad ties, the press time depends primarily upon the thickness of the composite article produced. For example, the press time is generally from about 200 seconds to about 300 seconds for a composite article with about a 0.5 inch thickness, and the press time increases proportionally thereof. It is contemplated that pressure may be utilized without any external heat added in any of the aforementioned steps. Alternatively, external heat may be utilized without any external pressure used in any of the aforementioned steps. Moreover, both external heat and pressure may be applied in any of the aforementioned steps.

Other suitable methods for forming the article, are described in the U.S. Pat. No. 6,451,101 to Mente et al.; U.S. Pat. No. 6,458,238 to Mente et al.; U.S. Pat. No. 6,464,820 to Mente et al.; U.S. Pat. No. 6,638,459 to Mente et al.; U.S. Pat. No. 6,649,098 to Mente et al., U.S. Pat. No. 6,344,165 to Coleman; U.S. Pat. No. 7,439,280 to Lu et al.; and U.S. Pat. No. 8,486,523 to Mente; and U.S. Publication No. 2005/0242459 to Savino et al., each of which is expressly incorporated herein in various non-limiting embodiments.

Without being bound or limited to any particular theory, it is thought that presence of the fiber component, such as a glass fiber component, improves the durability and utility of the composite article. Furthermore, it is thought that the combined presence of the binder component with the fiber component enables the resulting composite article to have properties desirable for wood structures and the like used in railroad ties, fencing, piling, decking and the like.

In addition, it is thought that the binder component with the fiber component is useful for reducing cure time of the adhesive system during manufacture of the article. As such, throughput of the articles can be increased via increased manufacturing speeds, e.g. press speeds (i.e., shorter pressing times). Other manufacturing benefits can also be realized, such as improved application of the components of the adhesive system to the plurality of wood pieces relative to conventional adhesives. In addition, it is believed that the articles include excellent physical properties. For example, in certain embodiments, the articles can have one or more of the following: increased bond strength, reduced edge swelling, improved release properties, improved flexural modulus, and/or reduced emissions, each relative to conventional articles. It is thought that other potential advantages afforded by the use of the binder and glass fiber component are: improved utility of the wood pieces; reduced binder component viscosity leading to improved distribution on the wood pieces; and improved flame test performance of the articles. It is thought that the combination of the binder and fiber components can also improve the performance of other, optional, components utilized to form the articles, such as polyols through phase transfer catalysis and/or viscosity reducing mechanisms.

In various embodiments, use of the combination of the binder and fiber components may increase processing speeds 1, 2, 3, 4, 5, 6, 7, 8, 9, 10, 15, 20, percent or more. The increase in processing speed may be achieved with minimal, if any, increase in destructive forces applied to the developing article during formation. Alternatively, use of the combination of the binder and glass fiber components may decrease the destructive forces applied to the developing article.

In an embodiment, provided herein are wood composite articles comprising: a plurality of wood pieces; and an adhesive system disposed on said plurality of wood pieces for bonding said plurality of wood pieces. The adhesive system may comprise a binder component, wherein the binder component comprises a thermosetting plastic material component; and a fiber component. The wood pieces comprise hardwoods, softwoods, creosote treated hardwood, creosote treated softwood, non-creosote wood, pressure-treated wood, mulch of pine, cedar, oak, reclaimed wood, or recycled wood; and in certain embodiments, the wood pieces are chipped, shredded, mulched or sawed. The wood pieces vary in length from approximately 0.1 inch to 12 inches, 1-9 inches, 2-7 inches, or 3 inches. In certain embodiments, the thermosetting plastic material component of the binder component comprises thermosets, such as unsaturated polyesters, epoxy, polyurea, or polyurethane and combinations thereof. The thermosetting plastic material component may comprise at least one isocyanate compound and an isocyanate-reactive component containing at least one isocyanate-reactive compound.

In certain embodiments, the isocyanate compound of the thermosetting plastic material may comprise a polyisocyanate comprising ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1-isocyanato-3,3,5-trimethyl-5-isocyanatomethyl-cyclohexane ("isophorone diisocyanate"), 2,4- and 2,6-hexahydrotoluene diisocyanate, dicyclohexylmethane-4,4'-diisocyanate ("hydrogenated MDI", or "HMDI"), 1,3- and 1,4-phenylene diisocyanate, 2,4- and 2,6-toluene diisocyanate ("TDI"), diphenylmethane-2,4'- and/or -4,4'-diisocyanate ("MDI"), naphthylene-1,5-diisocyanate, triphenyl-methane-4,4',4"-triisocyanate, polyphenyl-polymethylene-polyisocyanates ("crude MDI"), norbornane diisocyanates, m- and p-isocyanatophenyl sulfonylisocyanates, perchlorinated aryl polyisocyanates, carbodiimide-modified polyisocyanates, urethane-modified polyisocyanates, allophanate-modified polyisocyanates, isocyanurate-modified polyisocyanates, urea-modified polyisocyanates, biuret-containing polyisocyanates, isocyanate-terminated prepolymers and mixtures thereof. In certain embodiments, the isocyanate-reactive component comprises an isocyanate-reactive compound from the group consisting of water, polyethers, polyesters, polyacetals, polycarbonates, polyesterethers, polyester carbonates, polythioethers, polyamides, polyesteramides, polysiloxanes, polybutadienes and polyacetones. In certain embodiments, the isocyanate-reactive component comprises a Mixture of isocycanate-reactive compounds having a number averaged molecular weight of 334 to 5140 and a number averaged functionality of 1 to 6. In some embodiments the isocyanate-reactive component includes: aromatic initiators such as: Pluracol® 736, commercially available from BASF; aliphatic initiators such as Pluracol® PEP 450, commercially available from BASF; ethylene diamines such as Quadrol® polyol, commercially available from BASF; Mannich aromatics such as CARPOL® MX 470, commercially available from Carpenter; and sucrose/glycerine polyols such as Pluracol® SG-470, commercially available from BASF; or any combination thereof.

In an embodiment, the binder component may further comprise a catalyst, wherein the catalyst includes but is not limited to tin carboxylate, amines, 1-methylimidizole, Fomrez® UL-29, Fomrez® UL-28, a blowing catalyst (i.e. Dabco® BL-19, DMDEE), a blocked catalyst (i.e. Toyocat® DB30, Polycat® SA-102), or combinations thereof. In some embodiments the binder component includes: castor oil, such as T31; polyether/polyester polyols such as Sovermol® 750, commercially available from BASF; aromatic polyester polyols such as Terol® 258, aromatic polyester commercially available from Huntsman; and grafted polyether polyols such as NIAX 31-28 commercially available from Union Carbide; or any combination thereof.

In an embodiment, the isocyanate-reactive component further comprises at least one additive, wherein the additive includes but is not limited to fillers, surfactants, light stabilizers, colorants, pigments, mold release agents, fungicides, mildewcides, or rheology control agents. The filler may comprise calcium carbonate, glass, sand, aggregate, silicates, rubber crumb, fly ash, or carbon black.

In an embodiment, the fiber of the binder component comprises fiberglass, E-glass, A-glass, C-glass, D-glass, R-glass, or S-glass, graphite, aramid, TPU, PBT, carbon fiber, nylon, or combinations thereof. The fiber component may comprise chopped fiber, continuous filament mat, dry use chopped woven mats, chopped strand mat, multi-end roving, non-wovens, single-end roving, technical fabrics and wet-use chopped strand or combinations thereof. Furthermore, the fiber component may comprise continuous strands of fiber or fragments of fiber having lengths of about 1/16" to 40 ft, 1/2"-20 ft, 3/4"-5 ft, 1" to 1 ft, 1.5" to 5".

In an embodiment, the wood composite articles further comprise additives, such as fillers, pigments, colorants, light stabilizers, mold release agents, pesticides, fungicides, mildewcides, rheology control agents. The fillers may comprise calcium carbonate, glass, sand, aggregate, silicates, rubber crumb, fly ash, shredded closed-cell foam jounce bumper, PA66 nylon, F311 fiberglass, F410 fiberglass, polypropylene microfilaments, carbon black or any combinations thereof.

In certain embodiments, the wood pieces may be utilized in an amount of from about 0.5 to about 90 parts, 5 to about 85 parts, 10 to about 80 parts, 15 to about 75 parts by weight based on 100 parts by weight of said article. In certain embodiments, the binder component may be utilized in an amount of from about 0.5 to about 50 parts, 5 to about 45 parts, 10 to about 30 parts by weight based on 100 parts by weight of said article. In certain embodiments, the fiber component may be utilized in an amount of from about 0.5 to about 30 parts, 5 to about 25 parts, 10 to about 20 parts by weight based on 100 parts by weight of said article.

The wood composite article may comprise various final embodiments, including but not limited to, a railroad tie, fence post, utility pole, or landscaping object.

Included are methods for forming the wood composite articles as described herein, said methods comprising the steps of: mixing the binder component and the fiber component to the plurality of wood pieces; disposing the plurality of wood pieces having the binder component and the fiber component dispersed therein into a mold or onto a carrier to form a mass; and applying pressure and/or heat to the mass for an amount of time to form the article.

In an embodiment, the wood composite article comprises a binder component comprising an isocyanate, Isocyanate 1, (such as monomeric MDI, based on 2,4- and 4,4'-MDI and polymeric MDI with a viscosity of 210 mPas at 25 degree C.); a first polyol, Polyol A (a naturally occurring triglyceride with a functionality of approximately 2.7; MW 933.5 g/mol); a second Polyol (such as toluenediamine-initiated polyol, propoxlated with functionality of approximately 3.9; MW 569 g/mol); a third polyol, Polyol C (such as a diol, propylene glycol, propoxylated having a functionality of approximately 2.0; MW 134.1 g/mol), optionally combined with a catalyst (such as dioctyltin dithioglycolate). The article may optionally comprise additional catalysts, additives, or fillers and combinations thereof.

The following examples, illustrating the articles, are intended to illustrate and not to limit the disclosure.

EXAMPLES

Example 1

Polyurethane Composite Railroad Ties, Formulation Variables

The technology herein is directed at composite railroad ties made using discarded railroad ties, polyurethane chemistry and fibers such as glass fibers.

Composite railroad ties are prepared by combining wood pieces made from shredded used railroad ties, a binder component and glass fibers, and then compressing the mixture in a heated press at approx. 21-110° C. The resulting mass is poured into preconfigured molds. In certain embodiments, the resulting mass is formed into sheets for subsequent formation into desired configurations.

The wood pieces (i.e. shredded railroad ties) utilized in these examples are approximately ¼" width×3" length, ranging from ¹⁄₁₆-½" in width and ½-6" in length.

The fibers utilized in these examples are glass fibers, and are about 1" pieces of fiber glass commercially available from the Jushi Group Co, Ltd. product code ER13-2400-180.

Several examples of binder component formulations are presented in Table 1, where amounts are in parts by weight.

TABLE 1

| Binder Formulations | | | | | |
|---|---|---|---|---|---|
|  | Ex A-1 | Ex A-2 | Ex A-3 | Ex A-4 | Ex A-5 |
| Polyol A | 26.31 | 50.00 | 54.98 | 49.98 | 44.98 |
| Polyol B | 18.42 | 35.00 | 30.00 | 35.00 | 40.00 |
| Polyol C | 7.89 | 15.00 | 15.00 | 15.00 | 15.00 |
| Catalyst 1 | 0.01 | 0.02 | 0.02 | 0.02 | 0.02 |
| Isocyanate 1 | 89.9 | 90.1 | 86.9 | 93.05 | 93.05 |

For Table 1 above, the components may be described as provided below:
- Polyol A: naturally occurring triglyceride; functionality around 2.7; MW 933.5 g/mol
- Polyol B: toluenediamine-initiated polyol, propoxlated; functionality 3.9; MW 569 g/mol
- Polyol C: diol, propylene glycol, propoxylated; functionality 2.0; MW 134.1 g/mol
- Catalyst 1: dioctyltin dithioglycolate
- Isocyanate 1: monomeric MDI (such as Lupranate M20), based on 2,4- and 4,4'-MDI and polymeric MDI with a viscosity of 210 mPas at 25 degree C.

Example 2

Comparative Studies of Varying Wood Composite Articles

Samples #1-4 were made according to the component ratios provided below (Tables 2-5), and tested for relative qualities as provided in Table 6.

TABLE 2

| Sample #1 | |
|---|---|
| Wood Pieces | Parts |
| Shredded railroad tie | 608.7 |
| Isocyanate Component | Parts |
| pMDI | 87.3 |
| Isocyanate Reactive Component | Parts |
| Polyol A | 54.98 |
| Polyol B | 30.00 |
| Polyol C | 15.00 |
| Catalyst | 0.02 |
| Total | 100.0 |
| Fiber Component | Parts |
| Chopped glass fiber | 140.8 |

TABLE 3

| Sample #2 | |
|---|---|
| Wood Pieces | Parts |
| Shredded railroad tie | 736.6 |
| Isocyanate Component | Parts |
| pMDI | 90.1 |
| Isocyanate Reactive Component | Parts |
| Polyol A | 49.98 |
| Polyol B | 35.00 |
| Polyol C | 15.00 |
| Catalyst | 0.02 |
| Total | 100.0 |
| Fiber Component | Parts |
| Chopped glass fiber | 23.8 |

TABLE 4

| Sample #3 | |
|---|---|
| Wood Pieces | Parts |
| Shredded railroad tie | 736.6 |
| Isocyanate Component | Parts |
| pMDI | 90.1 |
| Isocyanate Reactive Component | Parts |
| Polyol A | 49.98 |
| Polyol B | 35.00 |
| Polyol C | 15.00 |
| Catalyst | 0.02 |
| Total | 100.0 |
| Fiber Component | Parts |
| Chopped glass fiber | 23.8 |

TABLE 5

| Sample #4 | |
|---|---|
| Wood Pieces | Parts |
| Shredded railroad tie | 736.6 |
| Isocyanate Component | Parts |
| pMDI | 90.1 |
| Isocyanate Reactive Component | Parts |
| Polyol A | 49.98 |
| Polyol B | 35.00 |
| Polyol C | 15.00 |
| Catalyst | 0.02 |
| Total | 100.0 |
| Fiber Component | Parts |
| Chopped glass fiber | 23.8 |

TABLE 6

Physical properties of Example Composite Wood Articles

| Property | Test Method | units | Sample #1 | Sample #2 | Sample #3 | Sample #4 |
|---|---|---|---|---|---|---|
| Compressive Modulus | ASTM D1621 | psi | 20815 | 19007 | 13067 | 23520 |
| Compression Strength | ASTM D1621 | psi | 933 | 871 | 528 | 951 |
| Density | ASTM D1622 | lbs/ft3 | 49.2 | 46.3 | 45.2 | 49.0 |
| Flexural Modulus | ASTM D790 | psi | 334460 | 464911 | 243558 | 511458 |
| Screw/Nail Pull | ASTM D1761 | lb | 145 | 133 | 151 | 153 |
| Water Absorption | ASTM D1761 | lbs/ft3 | 6.7 | 8.7 | 12.7 | 10.1 |

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described herein in an illustrative manner, and it is to be understood that the terminology which has been used is intended to be in the nature of words of description rather than of limitation. Many modifications and variations of the present disclosure are possible in light of the above teachings. The present disclosure may be practiced otherwise than as specifically described within the scope of the appended claims. The subject matter of all combinations of independent and dependent claims, both single and multiple dependent, is herein expressly contemplated.

What is claimed is:

1. A wood composite article, comprising:
   a plurality of wood pieces; and
   an adhesive system disposed on said plurality of wood pieces for bonding said plurality of wood pieces;
   wherein said adhesive system comprises;
   a binder component, wherein the binder component comprises a thermosetting plastic material component; and
   a fiber component,
   wherein the fiber component utilized in an amount of from 10 to about 20 parts by weight based on 100 parts by weight of said article and
   the fiber component comprises at least one fiber selected from the group consisting of fiberglass, E-glass, A-glass, C-glass, D-glass, R-glass, or S-glass, aramid, thermoplastic polyurethane, polybutylene terephthalate, basalt fiber, nylon, and combinations thereof, excluding graphite and carbon fiber, and
   wherein the wood pieces range in length from approximately 0.1 inch to 12 inches.

2. The article of claim 1,
   wherein the wood pieces comprise at least one of hardwoods, softwoods, creosote treated hardwood, creosote treated softwood, non-creosote wood, pressure-treated wood, mulch of pine, cedar, oak, reclaimed wood, or recycled wood, and
   wherein the wood pieces are chipped, shredded, mulched or sawed.

3. The article of claim 2, wherein the wood pieces range in length from approximately 2-7 inches.

4. The article of claim 1, wherein the thermosetting plastic material component comprises at least one thermoset selected from the group consisting of unsaturated polyesters, epoxy, polyurea, polyurethane and combinations thereof.

5. The article of claim 1, wherein the thermosetting plastic material component comprises at least one isocyanate compound and an isocyanate-reactive component containing at least one isocyanate-reactive compound,
wherein the isocyanate compound comprises at least one isocyanate compound selected from the group consisting of polyisocyanate, ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate, 1-isocyanato-3,3,5-trimethyl-5-isocyanatomethyl-cyclohexane ("isophorone diisocyanate"), 2,4- and 2,6-hexahydrotoluene diisocyanate, dicyclohexylmethane-4,4'-diisocyanate ("hydrogenated MDI", or "HMDI"), 1,3- and 1,4-phenylene diisocyanate, 2,4- and 2,6-toluene diisocyanate ("TDI"), diphenylmethane-2,4'- and/or -4,4'-diisocyanate ("MDI"), naphthylene-1,5-diisocyanate, triphenyl-methane-4,4',4"-triisocyanate, polyphenyl-polymethylene-polyisocyanates ("crude MDI"), norbornane diisocyanates, m- and p-isocyanatophenyl sulfonylisocyanates, perchlorinated aryl polyisocyanates, carbodiimide-modified polyisocyanates, urethane-modified polyisocyanates, allophanate-modified polyisocyanates, isocyanurate-modified polyisocyanates, urea-modified polyisocyanates, biuret-containing polyisocyanates, isocyanate-terminated prepolymers, or combinations thereof, and
wherein the isocyanate-reactive component comprises at least one isocyanate-reactive compound selected from the group consisting of water, polyethers, polyesters, polyacetals, polycarbonates, polyesterethers, polyester carbonates, polythioethers, polyamides, polyesteramides, polysiloxanes, polybutadienes and polyacetones.

6. The article of claim 5, wherein the isocyanate-reactive component comprises a mixture of isocyanate-reactive compounds having a number averaged molecular weight of 334 to 5140 and a number averaged functionality of 1 to 6.

7. The article of claim 5, wherein the isocyanate-reactive component further comprises at least one catalyst, wherein the catalyst comprises organometallic tin catalysts, aminoalcohols, metal chlorides, triazines, alkali metal hydroxides, alkali metal salts, trimerization catalysts, and tertiary amine catalysts.

8. The article of claim 5, wherein the isocyanate-reactive component further comprises at least one additive selected from the group consisting of fillers, surfactants, light stabilizers, colorants, pigments, mold release agents, fungicides, mildewcides, or rheology control agents.

9. The article of claim 5, wherein said isocyanate-reactive component further comprises at least one filler selected from the group consisting of calcium carbonate, glass, sand, aggregate, silicates, rubber crumb, fly ash and carbon black.

10. The article of claim 1, wherein the fiber component comprises at least one fiber selected from the group consisting of fiberglass, E-glass, A-glass, C-glass, D-glass, R-glass, or S-glass, aramid, thermoplastic polyurethane, polybutylene terephthalate, nylon and combinations thereof.

11. The article of claim 1, wherein the fiber component is at least one fiber selected from the group consisting of chopped fiber, continuous filament mat, dry use chopped woven mats, chopped strand mat, multi-end roving, non-wovens, single-end roving, technical fabrics and wet-use chopped strand and combinations thereof.

12. The article of claim 1, wherein the fiber component comprises a continuous strand of fiber or fragments of fiber having lengths of about 1/16" to 40 ft.

13. The article of claim 1, further comprising at least one additive selected from the group consisting of fillers, pigments, colorants, light stabilizers, mold release agents, pesticides, fungicides, mildewcides, rheology control agents.

14. The article of claim 13, wherein said at least one additive is a filler selected from the group consisting of calcium carbonate, glass, sand, aggregate, silicates, rubber crumb, fly ash, or carbon black and combinations thereof.

15. The article of claim 1, wherein the wood pieces are utilized in an amount of from about 0.5 to about 90 parts by weight based on 100 parts by weight of said article.

16. The article of claim 1, wherein the binder component is utilized in an amount of from about 0.5 to about 50 parts by weight of said article.

17. The article of claim 1, wherein said article is a railroad tie, fence post, utility pole, or landscaping object and said article is not a sheathing material.

18. A method of forming a wood composite article comprising:
a plurality of wood pieces; and
an adhesive system disposed on said plurality of wood pieces for bonding said plurality of wood pieces;
wherein said adhesive system comprises;
a binder component, wherein the binder component comprises a thermosetting plastic material component; and
a fiber component,
wherein the fiber component utilized in an amount of from 10 to about 20 parts by weight based on 100 parts by weight of said article, and
the fiber component comprises at least one fiber selected from the group consisting of fiberglass, E-glass, A-glass, C-glass, D-glass, R-glass, or S-glass, aramid, thermoplastic polyurethane, polybutylene terephthalate, basalt fiber, nylon, and combinations thereof,
wherein the wood pieces range in length from approximately 0.1 inch to 12 inches,
wherein said method comprising the steps of:
mixing the binder component and the fiber component to the plurality of wood pieces;
disposing the plurality of wood pieces having the binder component and the fiber component dispersed therein into a mold or onto a carrier to form a mass; and
applying pressure and/or heat to the mass for an amount of time to form the article.

19. The method of claim 18,
wherein the thermosetting plastic material component comprises at least one thermoset selected from the group consisting of unsaturated polyesters, epoxy, polyurea, polyurethane or combinations thereof; and
wherein the thermosetting plastic material component comprises at least one isocyanate compound and an isocyanate-reactive component containing at least one isocyanate-reactive compound.

20. The article of claim 1, wherein the fiber component comprises a continuous strand of fiber or fragments of fiber having lengths of about 1.5" to 5".

21. The article of claim 1, wherein the wood pieces are utilized in an amount of from 15 to about 75 parts by weight based on 100 parts by weight of said article.

22. The article of claim 1, wherein the binder component is utilized in an amount of from 10 to about 30 parts by weight based on 100 parts by weight of said article.

* * * * *